US007296745B2

(12) United States Patent
Weisz et al.

(10) Patent No.: US 7,296,745 B2
(45) Date of Patent: Nov. 20, 2007

(54) STORE ITEM MARK DOWN SYSTEM AND METHOD

(75) Inventors: Robert Weisz, Kettering, OH (US); Robert Schuller, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 1401 days.

(21) Appl. No.: 10/062,016

(22) Filed: Jan. 31, 2002

(65) Prior Publication Data

US 2002/0116267 A1    Aug. 22, 2002

Related U.S. Application Data

(60) Provisional application No. 60/288,057, filed on May 2, 2001, provisional application No. 60/269,505, filed on Feb. 16, 2001.

(51) Int. Cl.
G06K 7/10 (2006.01)
(52) U.S. Cl. .......................... 235/462.01; 235/472.01; 235/383; 235/385; 705/14
(58) Field of Classification Search ........... 235/462.01, 235/462.08, 462.14, 472.01, 378, 383, 385; 705/14
See application file for complete search history.

(56) References Cited

U.S. PATENT DOCUMENTS

| | | | |
|---|---|---|---|
| 3,711,683 A | | 1/1973 | Hamisch, Sr. |
| 4,438,950 A | * | 3/1984 | Hamisch, Jr. ................. 283/70 |
| 4,929,818 A | * | 5/1990 | Bradbury et al. ............ 235/381 |
| 5,578,797 A | * | 11/1996 | Hewitt et al. .................... 177/5 |
| 5,885,011 A | * | 3/1999 | Kanazawa ..................... 400/61 |
| 6,722,568 B2 | * | 4/2004 | Blanford et al. ........ 235/462.11 |
| 2003/0037965 A1 | * | 2/2003 | Bennard .......................... 177/4 |
| 2004/0050941 A1 | * | 3/2004 | Hanyu et al. ................ 235/487 |

FOREIGN PATENT DOCUMENTS

EP    0853290 A2    7/1998

OTHER PUBLICATIONS

*Hobart Information Tracker*, Hobart Food Equipment (Oct. 2000).

* cited by examiner

*Primary Examiner*—Steven S. Paik
(74) *Attorney, Agent, or Firm*—Thompson Hine LLP

(57) ABSTRACT

In a store, a method of using a processing unit for marking down a package having an associated package specific price and an associated special package specific price is provided. The method includes the steps of (a) in the processing unit, receiving identifying information regarding the package; (b) identifying a discount for the package; (c) applying the discount to establish both a reduced package specific price and a reduced special package specific price; and (d) printing at least one discount label by a printer associated with the processing unit, including printing on the label each of (1) a scannable discount bar code, (2) the reduced package specific price and (3) the reduced special package specific price. The "identifying information" could be any of a variety of pieces of information such as, by way of example, a PLU, a package specific price, a special package specific price, a package serial number, a package weight, a price per unit weight, a special price per unit weight, or various combinations of the same.

35 Claims, 3 Drawing Sheets

STORE ITEM MARK DOWN SYSTEM AND METHOD

CROSS-REFERENCE

This application claims the benefit of U.S. provisional application Ser. No. 60/288,057 filed May 2, 2001 and U.S. provisional application Ser. No. 60/269,505 filed Feb. 16, 2001.

TECHNICAL FIELD

This application relates generally to retail stores having packaged perishable food items and, more particularly, to a system and method for providing markdowns in connection with items that include "frequent shopper" or other tiered pricing schemes.

BACKGROUND

In retail stores that sell perishable food items such as packaged ground beef, as much as twenty percent or more of such perishable food items end up being discounted or discarded. The man hours involved in effecting discounts can be substantial in view of the fact that perishables such as ground beef are typically taken to the back room, re-weighed, re-wrapped and re-labeled. Additionally, as much as fifty percent or more of the "shrink" or loss experienced by a store occurs in the perishables departments.

In a retail store including perishable items having bar code labels placed thereon, the bar code labels including a scannable bar code with a package specific price incorporated therein and an item identifier incorporated therein, it is known in the prior art to provide a method of marking down package prices including the steps of: (a) scanning an original bar code of a given item with a portable scanner; (b) identifying a discount for the given item using the portable scanner; (c) printing a discount bar code label with a printer associated with the scanner, the discount bar code label including a scannable discount bar code having a discounted package specific price incorporated therein which is determined based upon the discount identified in step (b), the scannable discount bar code also including an item identifier incorporated therein; and (d) applying the discount bar code label to the given item such that the original bar code is covered and the scannable discount bar code is exposed. The applied discount could be an established or entered percent discount, an established or entered set amount, or an established or entered flat price. This prior art hand-held unit could maintain a log of the mark downs made for uploading to the store computer system. Although previously used for non-frequent shopper or non-tiered pricing items, this prior art system/method did not provide suitable mark down capability for frequent shopper items.

Accordingly, it would be desirable to provide a system and method for facilitating discounts or mark downs of items having a frequent shopper or other tiered pricing scheme.

As used herein the term "frequent shopper" refers to any special pricing program that might be offered by a store to certain customers who participate in the program as identified by some type of member ID such as a program card. An alternative term commonly used in the industry for such programs is the term customer loyalty program. The term "special" is used in connection with pricing associated with such a program.

SUMMARY

In one aspect, in a store, a method of using a processing unit for marking down a package having an associated package specific price and an associated special package specific price is provided. The method includes the steps of (a) in the processing unit, receiving identifying information regarding the package; (b) identifying a discount for the package; (c) applying the discount to establish both a reduced package specific price and a reduced special package specific price; and (d) printing at least one discount label by a printer associated with the processing unit, including printing on the label each of (1) a scannable discount bar code, (2) the reduced package specific price and (3) the reduced special package specific price. The "identifying information" could be any of a variety of pieces of information such as, by way of example, a PLU, a package specific price, a special package specific price, a package serial number, a package weight, a price per unit weight, a special price per unit weight, or various combinations of the same.

In another aspect, in a store, a method of using a processing unit including a scanner for marking down a package having an associated package specific price, an associated special package specific price, an associated price per unit weight and an associated special price per unit weight is provided. The method involves (a) with the processing unit, scanning the package to capture identifying information regarding the package; (b) identifying a discount for the package; (c) applying the discount to the package specific price to establish a reduced package specific price; (d) applying the discount to the special package specific price to establish a reduced special package specific price; and (e) printing at least one discount label by a printer associated with the processing unit, including printing on the label each of (1) a scannable discount bar code incorporating the reduced package specific price, (2) the reduced package specific price and (3) the reduced special package specific price. The "identifying information" could be any of a variety of pieces of information such as, by way of example, a PLU, a package specific price, a special package specific price, a package serial number, a package weight, a price per unit weight, a special price per unit weight, or various combinations of the same.

In yet another aspect, in a store, a method of marking down a package having an associated package specific price, an associated special package specific price, an associated price per unit weight and an associated special price per unit weight is provided. The method involves (a) identifying the package specific price; (b) identifying the price per unit weight; (c) identifying the special price per unit; (d) identifying a percent discount for the package; (e) applying the percent discount to the package specific price to establish a reduced package specific price; (f) determining a special mark down weight of the package from the reduced package specific price and the price per unit weight; (g) multiplying the special price mark down weight by the special price per unit weight to establish a reduced special package specific price; and (h) printing at least one discount label, including printing on the label each of (1) a scannable discount bar code incorporating at least the reduced package specific price, (2) the reduced package specific price and (3) the reduced special package specific price.

In a further aspect, a package mark down system includes a computer readable storage medium and a package mark-down program stored on the medium and executable by a processing unit. The package mark down program has at least a special price mark down mode in which the following steps are performed based upon a package specific price, a price per unit weight, a special price per unit weight and a percent discount: (a) applying the percent discount to the package specific price to establish a reduced package specific price; (b) determining a special mark down weight from the reduced package specific price and the price per unit weight; (c) multiplying the special price mark down weight by the special price per unit weight to establish a reduced special package specific price; and (e) producing print specification data for a printing operation of a label printer to print at least one discount label having (1) a scannable discount bar code thereon incorporating the reduced package specific price, (2) the reduced package specific price printed thereon, and (3) the reduced special package specific price printed thereon.

In another aspect, a package mark down system includes a computer readable storage medium and a package markdown program stored on the medium and executable by a processing unit. The package mark down program has at least a normal mark down mode and a special price mark down mode, the normal mark down mode permitting a mark down operation to be performed using a selected one of at least two discount types including a percent discount and a money off discount, the special price mark down mode permitting a mark down operation to be performed only using a percent discount.

In yet a further aspect, a method of configuring a computer program to perform a mark down operation for a given store on items including both a package specific price and a special package specific price is provided. The method includes the steps of identifying a point of sale special price calculation algorithm of the given store; and incorporating the point of sale special price calculation algorithm into at least one mark down mode of the computer program.

DESCRIPTION

Figure 1:
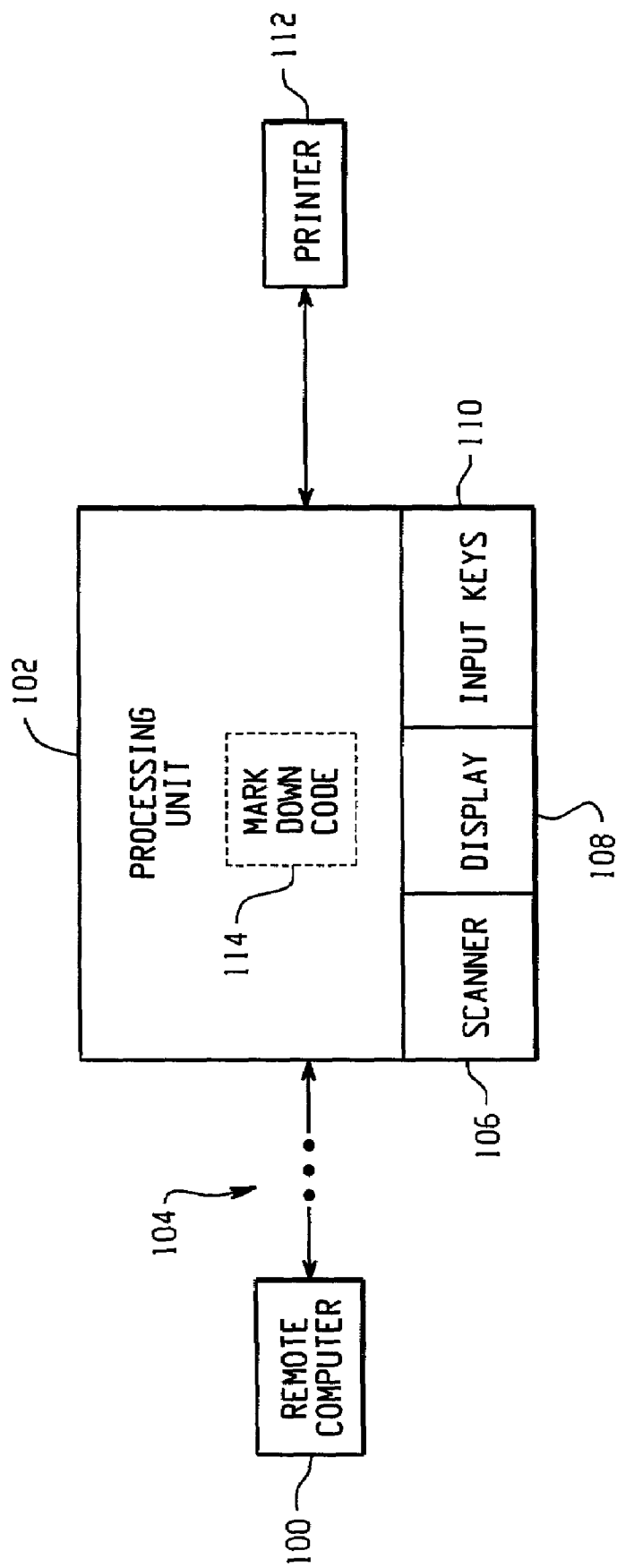
FIG. 1 is a schematic showing a retail system including a processing unit useful for in-store mark downs.

Referring to FIG. 1 an exemplary retail system includes a remote computer 100 and a processing unit 102. The processing unit 102 may be operable for communication with the remote computer 100 via a communications link 104. The remote computer 100 may be part of an in-store computer system, such as a point-of-sale system. The remote computer 100 might also be a regional or enterprise server for the particular store chain of which the store forms a part. The processing unit 102 may, for example, be a portable unit such as a hand held unit including an associated scanning unit 106 such as an optical scanning wand attached thereto or optical scanner integrated in the unit housing for scanning bar codes. The scanning unit 106 might also be an RF type scanner used to scan RFID tags on products. The processing unit may also include a display screen 108 for displaying information to a user, and a series of input keys 110 (including a scan trigger key) for operating the unit. The processing unit 102 may also include a hard-line attached printer mechanism 112 (such as a hip mount printer) for printing labels, but the printer may instead have a wireless link with the processing unit 102 or might be integrated into the unit 102.

The communication link 104 may be a hard-line link, may be a wireless link such as RF or infrared, or may be formed by combinations of the two. Portions of the link 104 may also be connected through the Internet. In the case of a wireless link the processing unit 102 may include an RF or infrared transceiver or may be connected to a wired communications network where one or more access points with their own transceivers bridge the wireless and wired networks. The processing unit 102 may also include ports for making a hard connection to the remote computer 100 or other devices. Any suitable protocol may be used in connection with transfer of information via the communications link 104.

In one embodiment, the processing unit 102 is a portable scanner such as a Telxon brand scanner or a Symbol brand scanner and product mark down code 114 is loaded into readable memory of the processing unit 102 to facilitate discounts/mark downs of products. The mark down code 114 may also include associated code for tracking mark downs. The tracked mark downs may be uploaded to the remote computer 100 on a periodic or continuous basis via the communications link 104.

Figure 2:
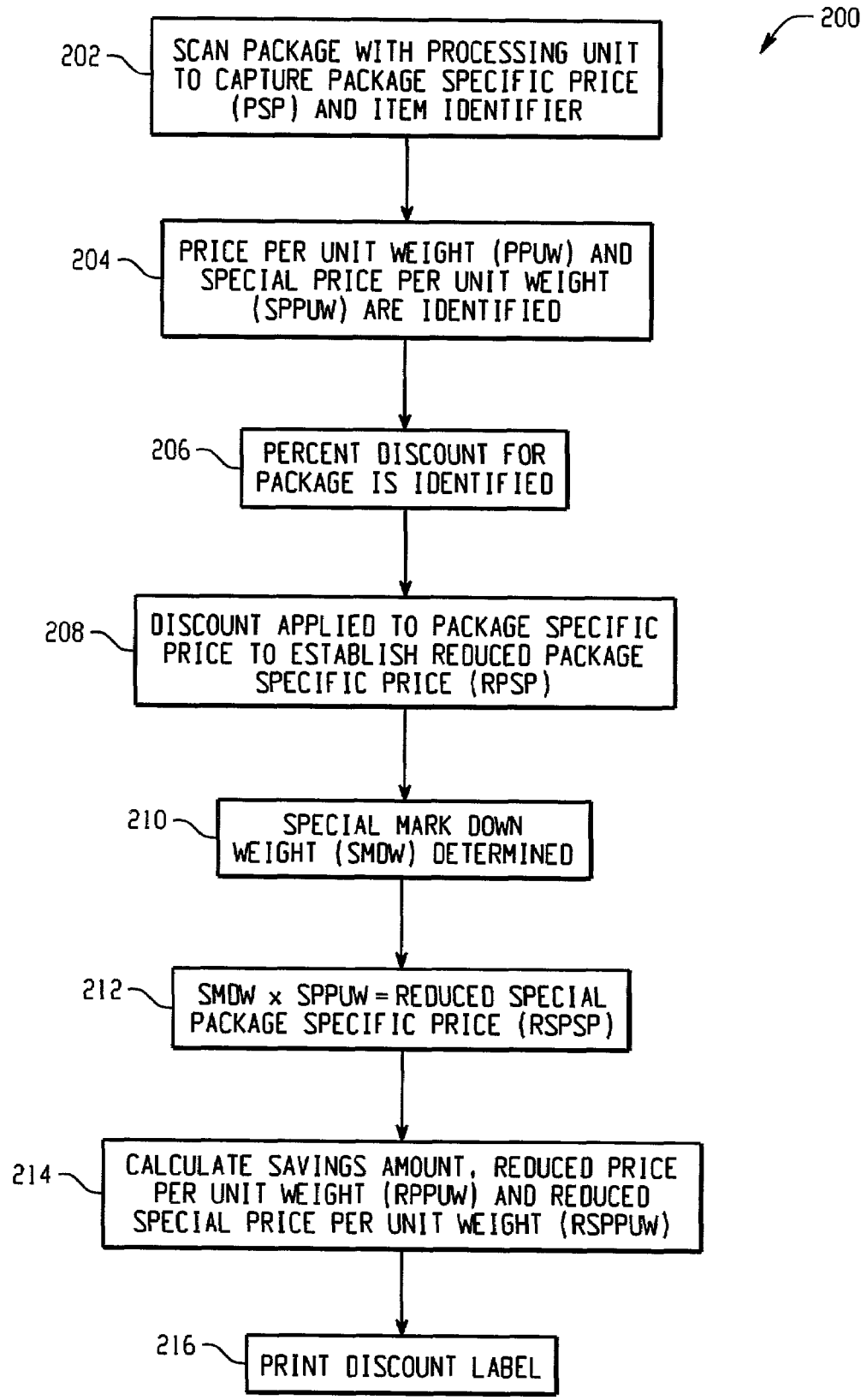
FIG. 2 is a flow chart illustrating an exemplary mark down process.

Reference is now made to FIG. 2 showing a flow chart 200 of steps associated with one embodiment of a frequent shopper mark down operation. Prior to step 202 the processing unit 102 is placed in a frequent shopper mark down mode. In certain cases, the frequent shopper mark down mode may be the only mark down provided by the processing unit 102. In other cases, the processing unit 102 may include other mark down modes, such as a non-frequent shopper or normal mark down mode. As used herein, the term frequent shopper mark down mode describes a mode in which the product to be marked down includes both a normal price and a special price for customers who participate in the store's frequent shopper program.

At step 202 a package is scanned to capture a package specific price (normal price) and an item identifier such as a PLU number. The package may, for example, be a wrapped meat or fish product having an associated package specific price ("PSP"), an associated special package specific price ("SPSP") (frequent shopper price), an associated price per unit weight ("PPUW") and an associated special price per unit weight ("SPPUW"). The wrapped product may commonly have a label applied to it that identifies one or more of the item identifier, the PSP, the SPSP, the PPUW and the SPPUW. For example, the label applied to the package may include an associated bar code (e.g. UPC-A or UPC-E) incorporating the PSP and the item identifier. In such cases, the scanning mechanism 106 of the processing unit 102 may be an optical scanner that scans the bar code to capture the PSP and the item identifier. As another example, the package could incorporate an RFID tag that stores pertinent package information such as the PSP and the item identifier and in such cases the scanning mechanism 106 of the processing unit 102 may be an RF scanner that retrieves the information from the RFID tag. As an alternative to scanning, the mark down code of the processing unit could be configured to have the user manually enter the package information such as the PSP and the item identifier. Where the processing unit is a portable unit the subject scanning operation or manual entering operations could be performed at the location within the store where the package is on display (e.g. the meat department or seafood department of a grocery).

At step 204 the PPUW and the SPPUW of the package are identified. Any number of techniques could be used to identify this information, including having the user manually enter the information, having the information captured by a scanning process as described above, having the processing unit 102 itself automatically identify the information via accessing a database stored on the processing unit 102 using the item identifier, or having the processing unit 102 send the item identifier to the remote computer 100 via link 104 to have the remote computer 100 access the information in one of its databases and then return the information to the processing unit 102 via the link 104. A calculation could also be used for identifying either or both of the PPUW and the SPPUW.

At step 206 a percent discount to be applied in the mark down operation is identified. Such percent discount identification could be made via a number of techniques such as having an established percent discount previously set in the processing unit (e.g. established at the time the processing unit is placed in the frequent shopper mark down mode), having the user manually enter the discount percentage via input keys 110 (e.g. the user manually enter a number, the user selects a discount from among a number of discounts displayed on the display 108, the user actuates an increase/decrease key to modify a displayed discount until the desired discount is reached), having the processing unit 102 itself automatically identify the information via accessing a database stored on the processing unit 102 using the item identifier, or having the processing unit 102 send the item identifier to the remote computer vial link 104 to have the remote computer access the information in one of its databases and then return the information to the processing unit 102 via the link 104. In either of the latter two cases the discount could be item specific, category specific, department specific or store specific.

At step 208 the discount is applied to the PSP to establish a reduced package specific price ("RPSP"). Application of the discount may involve a calculation within the processing unit 102. For example, if the identified discount is 10% the PSP may be multiplied by 90% to establish the RPSP, or if the identified discount is 20% the PSP may be multiplied by 80% to establish the RPSP.

At step 210 a special mark down weight ("SMDW") for the package may be determined. Determination of the SMDW may involve a calculation within the processing unit 102. For example, the SMDW may be calculated by the processing unit 102 as the RPSP divided by the PPUW. Thus, the SMDW will be less than the actual weight of the product. For example, assume a package of sirloin roast having a PPUW of $3.69/lb. and a PSP of $6.42. The actual weight of the assumed package is therefore 1.74 pounds. Assume further that a 50% discount has been applied to the PSP establishing an RPSP $3.21. In such case the SMDW is determined as (3.21/3.69)=0.87 pounds.

At step 212 a reduced special package specific price ("RSPSP") is determined as the SMDW multiplied by the SPPUW. Assuming a SPPUW of $2.99/lb., for the above noted example the SPPUW would be 0.87×2.98=$2.60.

At step 214 additional information may be calculated such as a frequent shopper saving amount (e.g. the difference between the RPSP and the RSPSP), a reduced price per unit weight ("RPPUW") (e.g. RPSP/actual package weight) and/or a reduced special price per unit weight ("RSPP UW") (e.g. RSPSP/actual package weight).

Figure 3A:
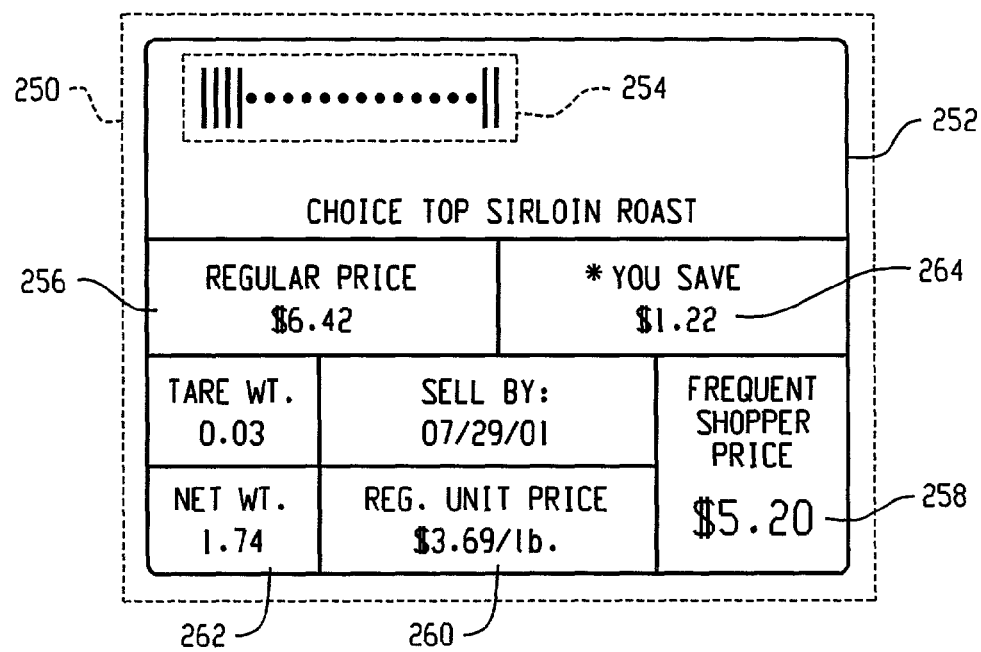
FIG. 3A shows a pricing label.
Figure 3B:
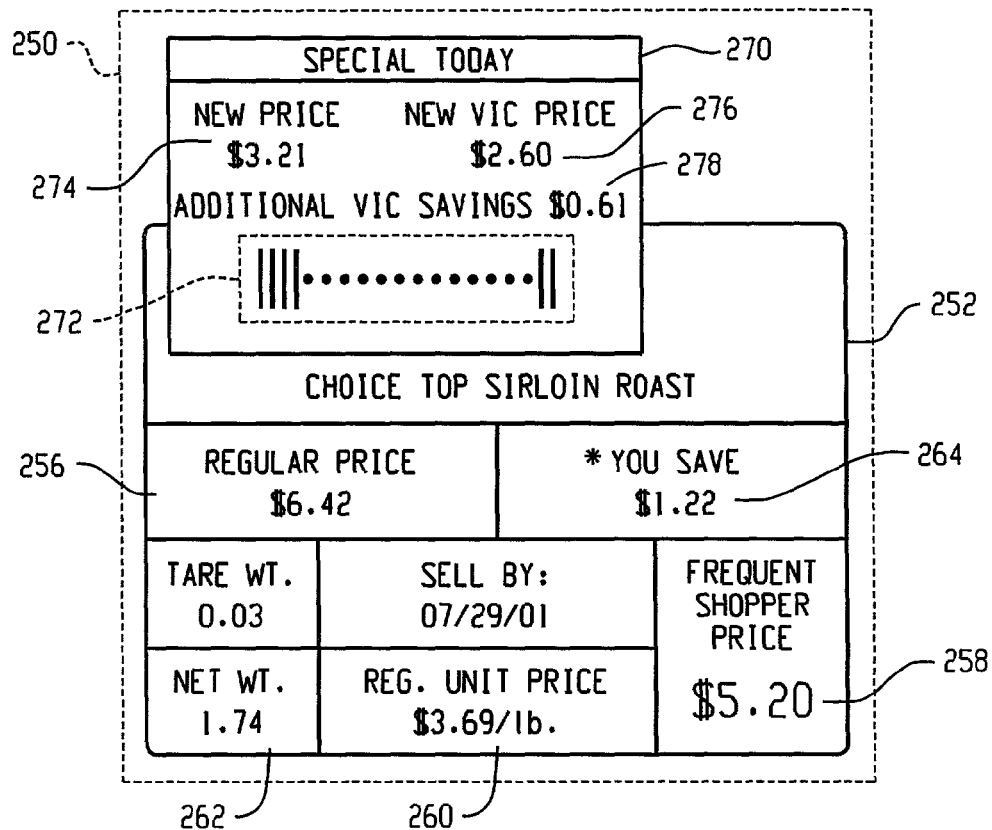
FIG. 3B shows a pricing label that has been partially overlayed by a mark down label.

At step 216 a discount label may be printed by the printer 112 associated with the processing unit 102 for application to the package. Referring to FIGS. 3A and 3B where one example of application of such a discount label is shown, FIG. 3A schematically illustrates a package 250 having a standard label 252 applied thereto with an associated bar code 254 that is used for scanning at the point of sale.

Additional information printed on the label 252 includes the PSP 256, the SPSP 258, the PPUW 260, the actual package weight 262, and a savings amount 264 of the SPSP over the PSP. At the conclusion of a mark down operation as described above, a discount label 270 is printed and applied to the package 250 (see FIG. 3B). As shown, information printed on the discount label 270 may include a discount bar code 272, the RPSP 274, the RSPSP 276 and a savings amount 278 of the RSPSP over the RPSP. Additional information might also be printed on the package such as the RPPUW and the RSPPUW if desired. The illustrated discount label 270 is applied to the package 250 such that the label 270 covers the original bar code 254 of the package 250 so that the discount bar code 272 is the only bar code visible for scanning at the point of sale.

In the case of a package including a label having an associated RFID tag but no bar code, a discount label could similarly be printed and applied to the package. In such cases the processing unit 102 could also be configured via the mark down code to rewrite appropriate information the RFID tag, such as the reduced pricing information.

Referring again to the frequent shopper mark down procedure described in connection with FIG. 2, special discussion is warranted relative to steps 210 and 212, the purpose of such steps in the illustrated embodiment being to provide accuracy at the point of sale. In particular, one commonly used bar code scheme and point of sale calculation scheme provides that the bar code includes the PSP for the package and an item identifier (such as PLU) for the item and that at the point of sale the bar code is scanned and the PLU and PSP are captured. The POS system uses the PLU to look up the PPUW and the SPPUW in a database, the POS system calculates a weight of the item and then the POS system calculates the SPSP by multiplying the calculated weight by the retrieved SPPUW. In performing the weight calculation the POS system of a given store may use a particular algorithm and rounding technique and in calculating the SPSP the POS system of the given store may also use a particular rounding technique. In such a store, in order to provide consistency between the RSPSP determined during mark down and the RSPSP determined at the point of sale, the package weight calculation algorithm and rounding techniques can be incorporated into steps 210 and 212. For example, where the processing unit 102 itself will perform the calculations of steps 210 and 212, the algorithm and rounding techniques may be incorporated into the mark down code 114. In this manner, after the RPSP is determined during mark down, the RSPSP is then determined during mark down in the same manner as it will be at the point of sale, eliminating the possibility of any discrepancy between the RSPSP listed on the discount label and the RSPSP given at the point of sale.

One of the most common point of sale SPSP calculation techniques currently used is an IBM algorithm as follows:

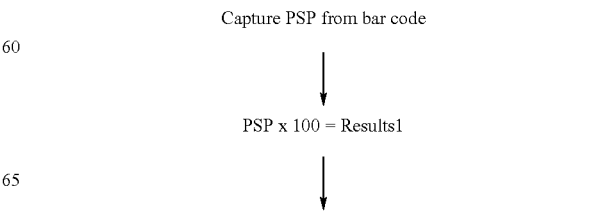

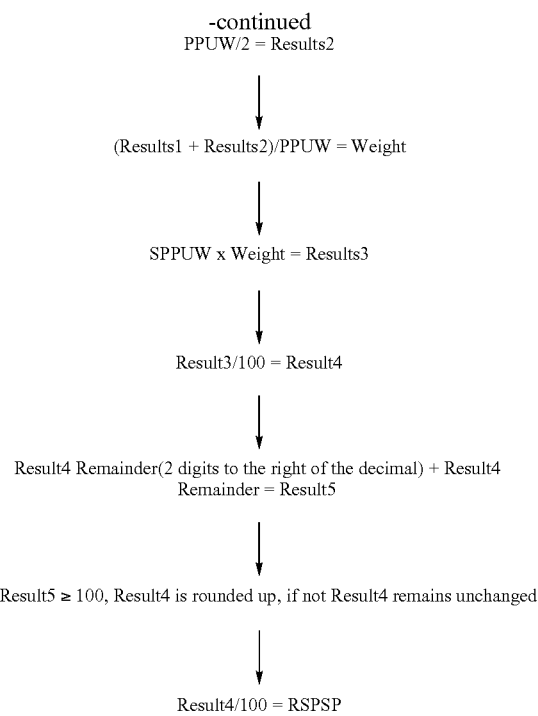

The Results 1 calculation above may also include its own rounding rules.

Of course, the above algorithm is merely exemplary, as other algorithms and rounding techniques may be used by differing point of sale systems. However, in certain cases it will be desirable to take such factors into consideration. In such cases a desirable method of configuring a computer program to perform a mark down operation for a given store on items including both a PSP and a SPSP involves identifying a point of sale special price calculation algorithm of the given store and incorporating the point of sale special price calculation algorithm into at least one mark down mode of the computer program. The computer program may also be configured to perform the incorporated special price calculation algorithm during a mark down operation only after a RPSP has been established.

Further, where the point of sale SPSP calculation is similar to that described above, it may be important to limit the available discount technique to a percent discount only, again in order to assure that the RSPSP established at mark down is the same as the RSPSP calculated and given to the consumer at the point of sale. In such cases, and where a normal mark down mode is desired in addition to the frequent shopper mark down mode, the mark down code may be configured such that in the normal mark down mode mark down operations may be performed using a selected one of at least two discount types including a percent discount and a money off discount, and such that in the special price mark down mode mark down operations can be performed only using a percent discount. It is recognized that on a given processing unit 102 the mark down code may be formed by an integrated code for performing normal mark down operations and special price mark down operations, or the mark down code may be formed by separate programs for each mode that are loaded onto the same processing unit 102.

It is recognized that in some cases it may not be necessary to incorporate any point of sale algorithm into the mark down procedure. For example, where a more advanced bar code (e.g. an RSS14, EAN13, EAN/UCC 128 or other composite bar code) is used by the store, the store may be set up to incorporate both the PSP and the SPSP into the composite bar code of the label for direct reading at the point of sale. In such case, the discount could simply be applied directly to each of the PSP and the SPSP without any special algorithm (e.g. calculation of an SMDW) or rounding if the discount label is printed with a composite bar code including the resulting RPSP and the RSPSP incorporated therein.

An alternative frequent shopper mark down technique could involve the processing unit 102 transmitting the PSP and the item identifier to the remote computer 100 via link 104, the remote computer performing all of steps 204, 206, 208, 210, 212, and 214, and the remote computer transmitting the RPSP, RSPSP, savings amount, RPPUW and RSPPUW to the processing unit 102 for printing on the discount label as desired.

In another variation, a modified step 202 might include a user manually entering a serial number for the package, the serial number being used to obtain at least some of the information needed for the mark down operation from either a database or a remote computer database.

In a new variation of normal mode mark downs, the discount label bar code 272 could be configured such that the actual product weight and the RPSP are incorporated into the bar code along with the PLU for capture by the point of sale system. In such cases the point of sale system could use the captured weight to calculate the price based upon a retrieved PPUW for the captured PLU and could then compare the calculated price to the RPSP. Because the two would not match, the point of sale system could automatically determine that the package was marked down, facilitating tracking of marked down items at the point of sale.

In a store in which the standard package label bar code only incorporates the item identifier (e.g. PLU) and the weight of the package, frequent shopper mark downs could also be performed where the needed information such as PPUW and SPPUW are input manually or retrieved from a database based upon the PLU.

In connection with any mark down operation the processing unit 102 could track various data regarding the mark down and the information could be uploaded to the remote computer 100 enabling a store/chain to appreciate which products are being marked down more often than desired, and adjust inventory accordingly. Further, by uploading the mark down information to the remote computer 100, a store or chain will be able to coordinate data on sales collected by the point of sale system with the mark down data to reduce possible misinterpretation of mark downs as shrink.

Although the invention has been described and illustrated in detail it is to be clearly understood that the same is intended by way of illustration and example only and is not intended to be taken by way of limitation. Other changes and modifications could be made without departing from the invention. Accordingly, the spirit and scope of the invention are to be limited only by the terms of the appended claims.

What is claimed is:

1. In a store, a method of using a processing unit for marking down a package having an associated package specific price and an associated special package specific price, the method comprising the steps of:
   (a) in the processing unit, receiving identifying information regarding the package;
   (b) identifying a discount for the package;

(c) applying the discount to establish both a reduced package specific price and a reduced special package specific price; and (d) printing at least one discount label by a printer associated with the processing unit, including printing on the label each of (1) a scannable discount bar code, (2) the reduced package specific price and (3) the reduced special package specific price.

2. The method of claim 1 further including the step of determining a savings amount of the reduced special package specific price over the reduced package specific price, and step (d) includes printing the savings amount on the discount label.

3. The method of claim 1 wherein the scannable discount bar code incorporates the reduced package specific price.

4. The method of claim 3 wherein the scannable discount bar code incorporates the reduced special package specific price.

5. The method of claim 1 further including the steps of determining both a reduced price per unit weight and a reduced special price per unit weight of the package; and
printing both the reduced price per unit weight and the reduced special price per unit weight on the discount label in step (d).

6. The method of claim 1 further including the step of: applying the discount label to the package.

7. The method of claim 1 wherein steps (b) and (c) are both performed within the processing unit.

8. The method of claim 1 wherein the processing unit includes a communications link to a remote computer, and steps (b) and (c) are performed by the remote computer.

9. The method of claim 1 wherein step (c) involves utilizing a point of sale calculation algorithm of the store to establish the reduced package specific price.

10. In a store, a method of using a processing unit including a scanner for marking down a package having an associated package specific price, an associated special package specific price, an associated price per unit weight and an associated special price per unit weight, the method comprising the steps of:

(a) with the processing unit, scanning the package to capture identifying information regarding the package;
(b) identifying a discount for the package;
(c) applying the discount to the package specific price to establish a reduced package specific price;
(d) applying the discount to the special package specific price to establish a reduced special package specific price; and
(e) printing at least one discount label by a printer associated with the processing unit, including printing on the label each of (1) a scannable discount bar code incorporating the reduced package specific price, (2) the reduced package specific price and (3) the reduced special package specific price.

11. The method of claim 10 wherein steps (b), (c) and (d) are all performed within the processing unit.

12. The method of claim 10 wherein the scanning involves at least one of (i) scanning a bar code of the package and (ii) scanning an RFID tag of the package.

13. The method of claim 10 wherein step (a) involves at least manually entering information into the processing unit via a user interface of the processing unit.

14. The method of claim 10 wherein the processing unit includes a communication link to a remote computer, step (a) includes forwarding the identifying information to the computer via the communication link, steps (b), (c) and (d) are performed by the computer, and the computer transmits the reduced package specific price and the reduced special package specific price to the processing unit via the communications link.

15. The method of claim 14 wherein the captured identifying information of step (a) includes the package specific price and an item identifier.

16. The method of claim 10 including the step of determining a savings amount of the reduced special package specific price over the reduced package specific price, and step (e) includes printing the savings amount on the discount label.

17. The method of claim 16 including the step of determining a reduced price per unit weight for the package, and step (e) includes printing the reduced price per unit weight on the discount label.

18. The method of claim 17 including the step of determining a reduced special price per unit weight of the package, and step (e) includes printing the reduced special price per unit weight on the discount label.

19. The method of claim 10 wherein the scannable discount bar code incorporates the reduced special package specific price.

20. In a store, a method of marking down a package having an associated package specific price, an associated special package specific price, an associated price per unit weight and an associated special price per unit weight, the method comprising the steps of:

(a) identifying the package specific price;
(b) identifying the price per unit weight;
(c) identifying the special price per unit;
(d) identifying a percent discount for the package;
(e) applying the percent discount to the package specific price to establish a reduced package specific price;
(f) determining a special mark down weight of the package from the reduced package specific price and the price per unit weight;
(g) multiplying the special mark down weight by the special price per unit weight to establish a reduced special package specific price; and
(h) printing at least one discount label, including printing on the label each of (1) a scannable discount bar code incorporating at least the reduced package specific price, (2) the reduced package specific price and (3) the reduced special package specific price.

21. The method of claim 20, further comprising:
applying the discount label to the package.

22. The method of claim 20, further comprising:
determining a difference between the reduced package specific price and the reduced special package specific price; and
in step (h) the difference is printed on the discount label.

23. The method of claim 20 wherein at least two of steps (a) through (g) are performed utilizing a portable unit including a processor.

24. The method of claim 23 wherein the percent discount is pre-established in the portable unit during a set-up sequence.

25. The method of claim 23 wherein the percent discount is entered by via a manual interface of the portable unit.

26. The method of claim 23 wherein the portable unit includes a bar code scanner and an associated printer.

27. The method of claim 26 wherein the package has a bar code label thereon, the bar code label including a scannable bar code with an item identifier incorporated therein, the portable unit scans the scannable bar code to receive the item identifier, wherein in step (d) the percent discount is communicated to the portable unit from a store computer system via a communication link based upon the item identifier.

28. The method of claim 26 wherein the package has a bar code label thereon, the bar code label including a scannable bar code incorporating the package specific price, in step (a) the package specific price is received by the portable unit scanning the scannable bar code of the package.

29. The method of claim 28 wherein the scannable bar code incorporates an item identifier, the portable unit receives the item identifier via scanning of the scannable bar code, wherein steps (b) and (c) involve the portable unit receiving the price per unit weight and the special price per unit weight via a wireless communication from a store computer system based upon the item identifier.

30. The method of claim 20, further comprising:
determining both a reduced price per unit weight and a reduced special price per unit weight of the package for printing on the discount label in step (h).

31. The method of claim 20 wherein steps (b) and (c) involve a user entering the price per unit weight and the special price per unit weight via a manual interface of the portable unit.

32. The method of claim 20 wherein each of steps (f) and (g) involve utilizing a rounding technique associated with a point of sale special price calculation algorithm of the store.

33. A package mark down system, comprising:
a computer readable storage medium;
a package markdown program stored on the medium and executable by a processing unit, the package mark down program having at least a special price mark down mode in which the following steps are performed based upon a package specific price, a price per unit weight, a special price per unit weight and a percent discount:
(a) applying the percent discount to the package specific price to establish a reduced package specific price;
(b) determining a special mark down weight from the reduced package specific price and the price per unit weight;
(c) multiplying the special price mark down weight by the special price per unit weight to establish a reduced special package specific price; and
(e) producing print specification data for a printing operation of a label printer to print at least one discount label having (1) a scannable discount bar code thereon incorporating the reduced package specific price, (2) the reduced package specific price printed thereon, and (3) the reduced special package specific price printed thereon.

34. A package mark down system, comprising:
a computer readable storage medium;
a package markdown program stored on the medium and executable by a processing unit, the package mark down program having at least a normal mark down mode and a special price mark down mode, the normal mark down mode permitting a mark down operation to be performed using a selected one of at least two discount types including a percent discount and a money off discount, the special price mark down mode permitting a mark down operation to be performed only using a percent discount;
wherein the package mark down program is configured for selection of the discount type a single time prior to performing multiple mark down operations in the normal mark down mode.

35. A package mark down system, comprising:
a computer readable storage medium;
a package mark down program stored on the medium and executable by a processing unit, the package mark down program having at least a normal mark down mode and a special price mark down mode, the normal mark down mode permitting a mark down operation to be performed using a selected one of at least two discount types including a percent discount and a money off discount, the special price mark down mode permitting a mark down operation to be performed only using a percent discount;
wherein the package mark down program is configured for selection of the discount type prior to any given mark down operation in the normal mark down mode.

* * * * *